Aug. 6, 1957  A. D. PASS  2,801,503
EXPANSIBLE DEVICE HAVING A HANDLE
Filed Dec. 21, 1954
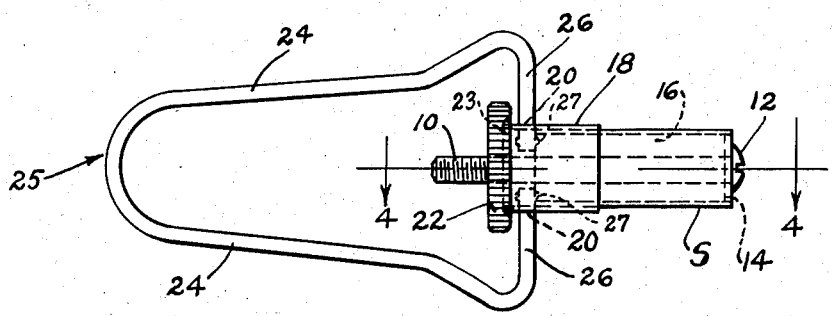
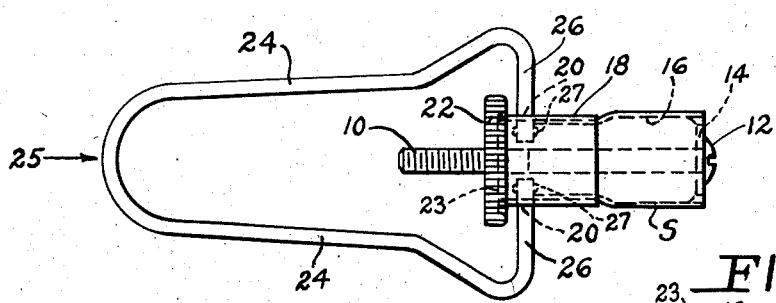
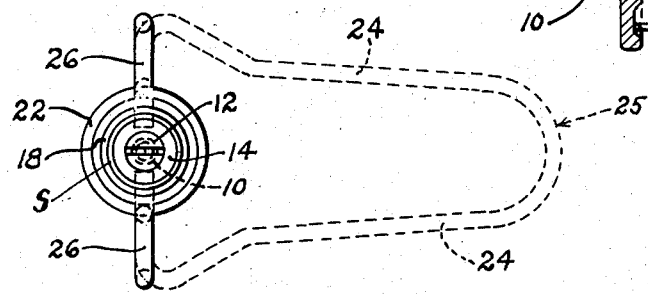
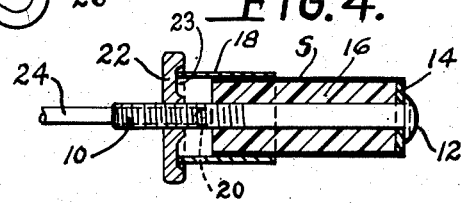
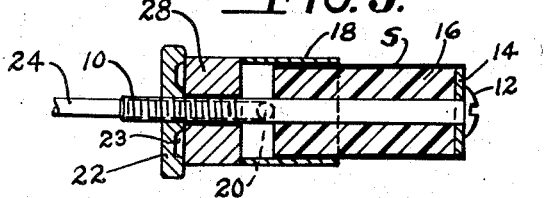
INVENTOR.
Arthur D. Pass
BY Harold E. Cole
Attorney

United States Patent Office 2,801,503
Patented Aug. 6, 1957

2,801,503

EXPANSIBLE DEVICE HAVING A HANDLE

Arthur D. Pass, Malden, Mass.

Application December 21, 1954, Serial No. 476,746

4 Claims. (Cl. 51—184.1)

This invention relates to an expansible device having a handle.

Reference is made to my co-pending patent application Serial No. 398,314, filed December 15, 1953.

One object of my invention is to provide an expansible device having a retainer member that receives a sheet of abrasive material, and to which a handle is movably attached, portions of the handle providing stop means whereby predetermined portions of said sheet and an expander member, are limited in movement within said retainer.

Another object of my invention is to provide parts for my device so constructed that they may mostly be made from material in stock, rather than have to make special dies to produce them.

A further object of my invention is to provide a construction with parts that may readily be assembled and disassembled, and which are convenient to use.

The foregoing and other objects which will appear as the nature of the invention is better understood, may be accomplished by a construction and arrangement such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawing:

Fig. 1 is a top plan view of my expansible device with the expander member in normal position.

Fig. 2 is a top plan view similar to Fig. 1; but showing the expander member in expanded position.

Fig. 3 is an end elevational view of my device.

Fig. 4 is a sectional view taken on the line 4—4 of Fig. 1.

Fig. 5 is a sectional view similar to Fig. 4; but showing a modification of my device.

As illustrated, my device has a supporting member 10 in the form of an elongate screw having a slotted head 12, against which bears an abutment 14, shown as a washer. Said abutment 14 also bears against an expander member 16, made of a resilient material such as rubber, or a rubber composition, and having a hole extending longitudinally therethrough to receive said supporting screw 10, the latter first passing through said washer 14.

Spaced from said expander member 16 is an open retainer 18 or hollow sleeve which has two holes 20 extending laterally therethrough which are opposite each other at the inner longitudinal half of said retainer 18, said half being the one farthest from said washer 14. Said supporting screw 10 freely extends through and beyond said retainer 18, and a portion of said expander member 16 also extends part ways into it, there being provided some space between said expander member portion, in normal position, and the interior surface of said retainer 18 to receive a sheet S of abrasive material such as emery paper. Said sheet is formed into general tubular shape, as by rolling of finger, with free ends, to fit into said space.

Inwardly of said retainer 18 is an actuating member 22 in the form of a knurled, adjusting nut that screw-threadedly connects with said supporting screw 10 and which has a circular recess 23 therein commencing at its face surface next to said retainer 18, being of such size that the end of the latter enters and is thereby firmly positioned therein.

When my device, with an abrasive sheet S outside of and around said expander member 16, is used to smooth the interior of a conduit, its operation is made practical and convenient by means of a handle 25 that has a pair of finger portions 24 connected at one end, and which has two arms 26 extending angularly from said finger portions. The end portions of said arms 26 movably extend through said holes 20 and into the interior of said retainer 18 whereby they serve as a stop to prevent said expander member 16 and the abrasive sheet S from passing farther inwardly into said retainer 18. Upset projections 27 on said arm end portions prevent the latter from passing through said holes 20.

In Fig. 5 of the drawings I show a spacer member 28 between and abutting said actuating member 22 and said retainer 18, whereby said actuating member can be more readily grasped by the fingers in case the retainer 18 is equal in diameter or only slightly smaller than said actuating member.

In use, the actuating member is screwed against said retainer 18 until said expander member 16 enlarges in diameter sufficiently so that the sheet S around it will contact with the interior of the conduit or fitting to be sanded or smoothed. Upon insertion of said expander member into said conduit or fitting it is rotated by use of said handle 25, and since the latter is pivotally mounted in said retainer 18 it may be moved to any desired position.

What I claim is:

1. An expansible device comprising a supporting member, an abutment supported by one end of said supporting member, a retainer movably mounted on said supporting member having an opening therein and having two holes extending laterally therethrough, an actuating member movably mounted on said supporting member, and an expander member mounted on said supporting member between said abutment and said retainer, part of which expander member extends into said retainer opening, said expander member being adapted to be expanded when said actuating member moves said retainer towards said abutment, said expander member exterior being of such normal size relative to the interior surface of said retainer opening that there normally is a space between said retainer and said expander member part to receive a sheet of abrasive material, and a handle embodying two arms the end portions of which extend through said laterally extending holes and into said retainer opening to thereby constrict the latter to such size that said expander member cannot move beyond said handle end portions in said opening.

2. An expansible device comprising a supporting member, an abutment supported by one end of said supporting member, a retainer sleeve movably mounted on said supporting member having an opening therethrough and having two holes extending laterally therethrough at the inner half of its length, an actuating member movably mounted on said supporting member, and an expander member mounted on said supporting member between said abutment and said retainer, part of which expander member extends into said retainer sleeve, said expander member being adapted to be expanded when said actuating member moves said retainer towards said abutment, said expander member exterior being of such normal size relative to the interior surface of said retainer that there normally is a space between said retainer and said expander member part to receive a sheet of abrasive material, and a handle embodying two arms the end portions of which extend through said laterally extending holes and into said retainer sleeve interior to thereby constrict the latter to such size that said expander member cannot move beyond said handle end portions in said opening.

3. An expansible device comprising a supporting member, an abutment supported by one end of said supporting member, a retainer sleeve movably mounted on said supporting member having an opening therethrough, and having two holes extending laterally therethrough at the inner half of its length, an actuating member movably mounted on said supporting member, and an expander member mounted on said supporting member between said abutment and said retainer, part of which expander member extends into said retainer sleeve, said expander member being adapted to be expanded when said actuating member moves said retainer towards said abutment, and a handle embodying two finger portions connected at one end and two arms extending angularly from the opposite ends of said finger portions the ends of which arms extend through said laterally extending holes and into said retainer opening to thereby constrict the latter to such size that said expander member cannot move beyond said handle end portions in said opening.

4. An expansible device comprising a supporting member, an abutment supported by one end of said supporting member, a retainer movably mounted on said supporting member having an opening therein and having two holes extending laterally therethrough, an actuating member movably mounted on said supporting member, and an expander member mounted on said supporting member between said abutment and said retainer, part of which expander member extends into said retainer opening, said expander member being adapted to be expanded when said actuating member moves said retainer towards said abutment, said expander member exterior being of such normal size relative to the interior of said retainer member opening that there normally is a space between said interior and said expander member part to freely receive a sheet of abrasive material, and a handle embodying two arms the end portions of which extend through said laterally extending holes and into said retainer opening to thereby constrict the latter to such size that said expander member cannot move beyond said end portions in said opening.

References Cited in the file of this patent

UNITED STATES PATENTS

| | | |
|---|---|---|
| 22,535 | Willoughby | Jan. 4, 1859 |
| 1,176,463 | Kimmel | Mar. 21, 1916 |
| 1,203,349 | Jorns | Oct. 31, 1916 |
| 2,599,077 | Sturgis | June 3, 1952 |

FOREIGN PATENTS

| | | |
|---|---|---|
| 563,199 | Great Britain | Aug. 2, 1944 |